(12) United States Patent
Wang et al.

(10) Patent No.: US 7,830,260 B2
(45) Date of Patent: Nov. 9, 2010

(54) LEARNING DEVICE USING RFID TAGS

(75) Inventors: Chi-Hu Wang, Hsin Chu (TW);
Ching-Cheng Tien, Hsin Chu (TW);
Chi-Kuang Hwang, Hsin Chu (TW);
Chien-Jung Chiu, Hsin Chu (TW);
Chia-Wen Wu, Hsin Chu (TW);
Bore-Kuen Lee, Hsin Chu (TW);
In-Hang Chung, Hsin Chu (TW);
Tung-Chou Chen, Hsin Chu (TW);
Ming-Ching Yen, Hsin Chu (TW);
Jwu-E Chen, Hsin Chu (TW)

(73) Assignee: Chung Hua University, Hsin Chu (TW)

( * ) Notice: Subject to any disclaimer, the term of this patent is extended or adjusted under 35 U.S.C. 154(b) by 849 days.

(21) Appl. No.: 11/727,562

(22) Filed: Mar. 27, 2007

(65) Prior Publication Data
US 2008/0048869 A1 Feb. 28, 2008

(30) Foreign Application Priority Data
Aug. 23, 2006 (TW) .............................. 95130916 A

(51) Int. Cl.
*G08B 13/14* (2006.01)
(52) U.S. Cl. ................................... 340/572.1; 434/128
(58) Field of Classification Search .............. 340/572.1, 340/572.7, 572.8, 10.1; 434/128
See application file for complete search history.

(56) References Cited

U.S. PATENT DOCUMENTS

| 2006/0017571 | A1* | 1/2006 | Arnold et al. ............ 340/572.7 |
| 2006/0144951 | A1* | 7/2006 | Schiebler .................... 235/487 |
| 2008/0021766 | A1* | 1/2008 | McElwaine et al. .......... 705/10 |

* cited by examiner

*Primary Examiner*—Jeffery Hofsass
(74) *Attorney, Agent, or Firm*—Rosenberg, Klein & Lee

(57) ABSTRACT

A learning device using RFID tags is provided. The learning device includes a platform and at least one RFID tag unit. The tag unit includes at least one RFID tag with an identification code and a magnet at the inner space of the RFID tag unit. When the RFID tag unit is placed at an interrogation zone of the platform, the magnet actuates the magnet-induced switch to turn on and drives the power supply device to provide power. The signal S1 from the RFID tag is transmitted though the RFID reader for decoding and the processing unit for processing. The signal is sent to an audio/video output device for displaying and broadcasting. A plurality of platforms are formed a platform array, each of the platform including at least one receiver and at least one transmitter correspondent to the receiver, the transmitter transmitting a signal which represents the position of the transmitter, while the receiver receiving signals from the transmitter to recognize the relative positions of the platforms.

3 Claims, 4 Drawing Sheets

LEARNING DEVICE USING RFID TAGS

FIELD OF THE INVENTION

The present invention relates to a learning device, and more particularly to a learning device using RFID tags with multiple identification codes for providing a convenient and interesting learning.

BACKGROUND OF THE INVENTION

There are a variety of learning machines in the market, which enable the users to learn a skill or knowledge, such as learning English at home. The conventional learning machine generally comprises a reader and a plurality of cards. Each card has a character, word, symbol or drawing at one side and has a magnetic stripe at the other side. The magnetic stripe is recorded with message corresponding to the symbol at the other side. By inserting a card to a pocket in the learning machine, the message in the card is read by the card reader and broadcast though a speaker. This learning machine provides a boring and inconvenient way of learning, as the user has to keep changing the cards.

There are a lot of software in the market that can be installed in a computer for learning through the computer. However, the cost of a computer and the software are very expensive. To start the software, the user has to turn on the computer and start up the operating system. It is not convenient for a kid to use, and also not able for the kid to carry the computer anywhere as he likes, e.g. from living room to bed room. The sight of the user may be damaged if he views the computer for a long time.

Barcode reader is widely used in the industry for reading a message on a barcode adhered on an object. However, in operation, errors are frequently found, especially when the barcode reader is not closed enough to the barcode for detection. Moreover, it is required to project light on the barcode for the barcode reader to read.

Recently, it is found that radio frequency identification (RFID) techniques have been applied to many applications for easily obtaining messages on an object. The message is stored in a RFID tag and a signal is transmitted wirelessly from the RFID tag to a RFID reader within an effective transmission distance. A large amount of messages can be transmitted by radio frequency identification. It is very simple and convenient to read a message by RFID.

In WO 2006/049374A1, a RFID sensor is disclosed. The RFID sensor comprises a plurality of RFID chips for monitoring different objects e.g. gas valve, door, window and so on. The RFID reader transmits a radio frequency signal to the RFID sensor at a predetermined period, and receives a frequency signal having the unique number of the chosen RFID chip from the RFID sensor. Then the RFID reader transmits the signal to the controller to recognize the used state of the monitored object. The controller can provide the information, e.g. "the gas valve is open", to the user through a Personal Digital Assistance. The system also comprises a selection unit for choosing the chip by a physical or an electrical operation and connecting the chosen chip to the RFID antenna. Therefore, the accessing of information from the chips is controlled to assure safety.

U.S. Pat. No. 6,486,780 discloses applications for radio frequency identification systems. RFID devices, including handheld RFID devices, and applications may be used in connections with items that are associated with an RFID tag, and optionally a magnetic security element. The devices and applications can be applied for management of books and materials in a library.

A multi-directional RFID antenna is disclosed in U.S. Pat. No. 6,069,564. The antenna provides multi-directional RF communication to a source, such as a RF tag, which comprises a plurality of coils for transmission of RF signals and a switch for selecting at least one of the RF antenna coils for transmission of the RF signal and receipt of the RF response signals whereby the RF signals can be directed toward and received from a plurality of different directions from a fixed position.

It is desired to develop a learning device by applying radio frequency identification such that the learning can be more lively and extensive.

SUMMARY OF THE INVENTION

The primary objective of the present invention is to provide a learning device using RFID tags, which enables the user to learn a knowledge or exercise a skill easily by placing the RFID tag units on the interrogation zones of the platform of the learning device.

Another objective of the present invention is to provide a learning device using RFID tags. Each RFID tag unit is printed with a plurality of visible symbols and is arranged with a plurality of RFID tags. With this design, each RFID tag unit can store many messages.

A further objective of the present invention is to provide a learning device with a plurality of RFID tag units, each of which comprises more than one RFID tags. Each of the RFID tags is provided with a shielding device for limiting the transmission of signal from the RFID tag to a single direction. The shielding device prevents the interference to an RFID antenna from the other RFID tags of the same RFID tag unit or from adjacent RFID tag units.

Yet a further objective of the present invention is to provide a learning device using RFID tags. The RFID tag unit comprises a magnet to actuate a magnet-induced switch arranged in the platform to turn on, which in turn drives the power supply device to switch on. When the RFID tag unit is taken away, the power supply device is shut off automatically. Accordingly, the power of the learning device can be saved effectively.

Another objective of the present invention is to provide a learning device. The learning device is arranged with a single RFID reader for reading the signals received through a plurality of RFID antennas at different interrogation zones of the platform. The RFID reader is set to read the signals from the RFID antennas according to a predetermined processing algorithm, e.g. reading the signals one by one at a predetermined interval. This design significantly saves the manufacture cost and reduces the dimension of the learning device.

Another objective of the present invention is to provide a learning device with platform array system. A plurality of platforms are formed a platform array, each of the platform including at least one receiver and at least one transmitter correspondent to the receiver, the transmitter transmitting a signal which represents the position of the transmitter, while the receiver receiving signals from the transmitter to recognize the relative positions of the platforms.

Another objective of the present invention is to provide a learning device for blind. The RFID tag unit is formed with at least one braille on an outer surface thereof for touch reorganization. The user, who is blind, can touch the braille to recognize the message of the RFID tag unit by his fingers. A touchable recognized element may be formed on the interrogation zone of the platform to provide a convenient learning device for the blind. An audio device capable of generating audio signal may be combined with the learning device to further help the learning of the blind.

To realize the above objectives, the present invention provides a learning device with RFID tags. The learning device includes a platform and at least one RFID tag unit. The RFID tag unit comprises at least one RFID tag with an identification code and a magnet at the inner space of the RFID tag unit. By means of a shielding device covering the RFID tag and the magnet, the signal from the RFID tag is limited to transmit though an inductive area of the RFID tag unit. When the RFID tag unit is placed at an interrogation zone of the platform, the magnet actuates the magnet-induced switch to turn on and drives the power supply device to provide power. The signal from the RFID tag is transmitted though the RFID reader for decoding and the processing unit for processing. The signal is sent to an audio/video output device for displaying and broadcasting.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
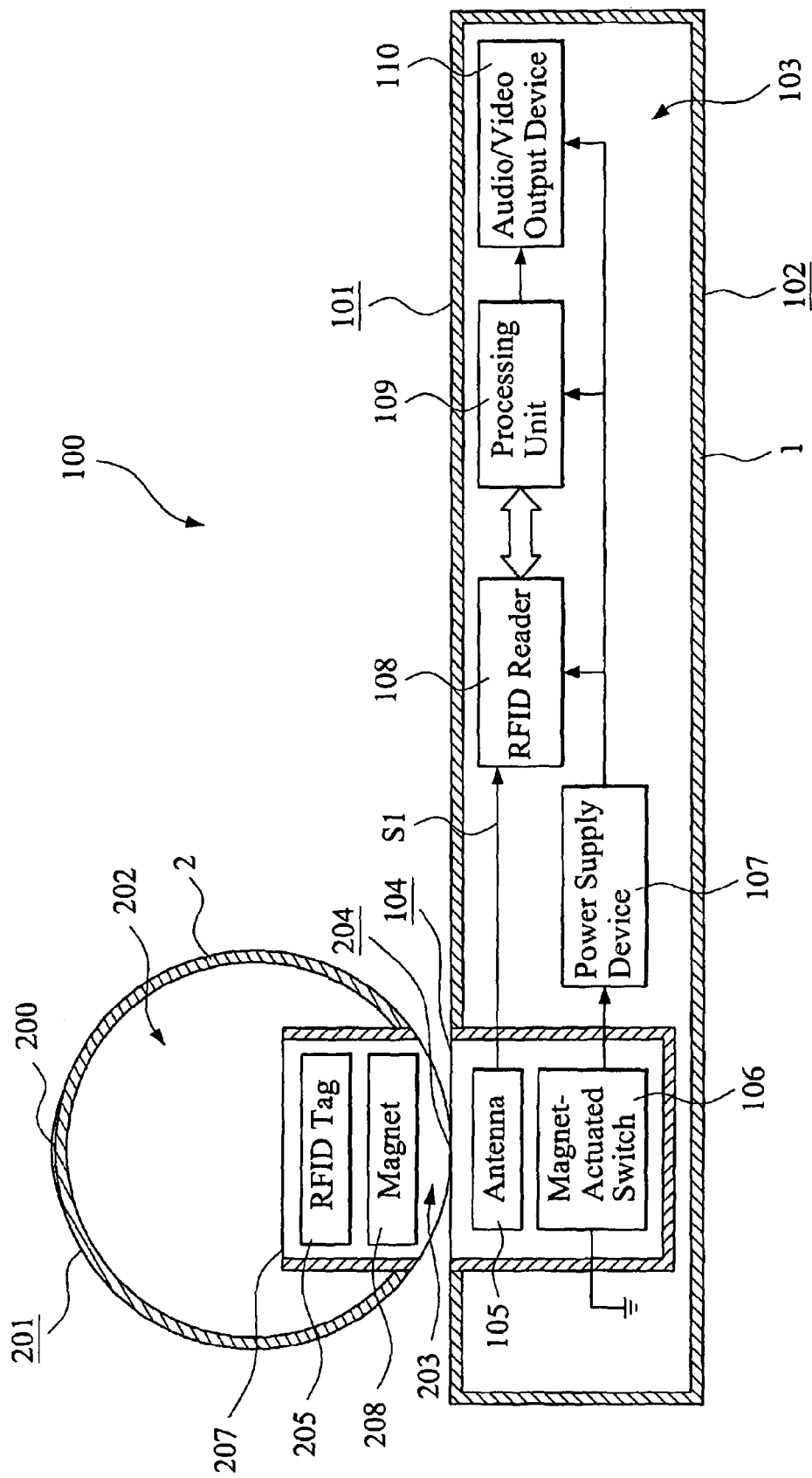
FIG. 1 is a schematic side view showing a learning device using RFID tags constructed in accordance with a first embodiment of the present invention.
Figure 2:
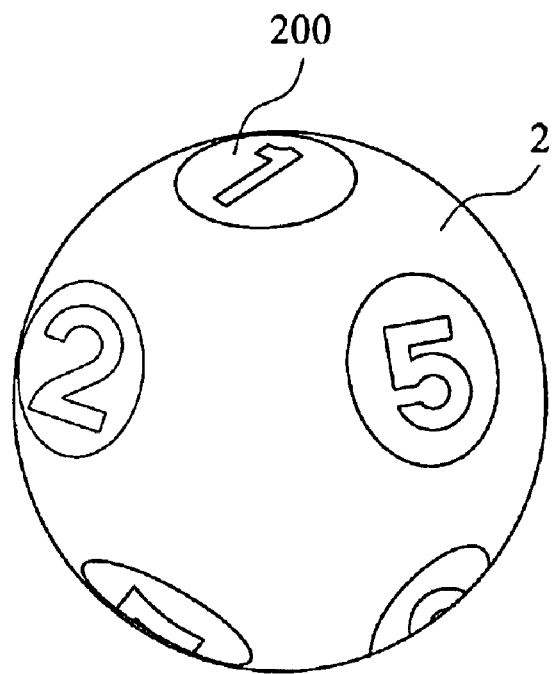
FIG. 2 is a perspective view showing a RFID tag unit of the learning device using RFID tags of FIG. 1.
Figure 3:
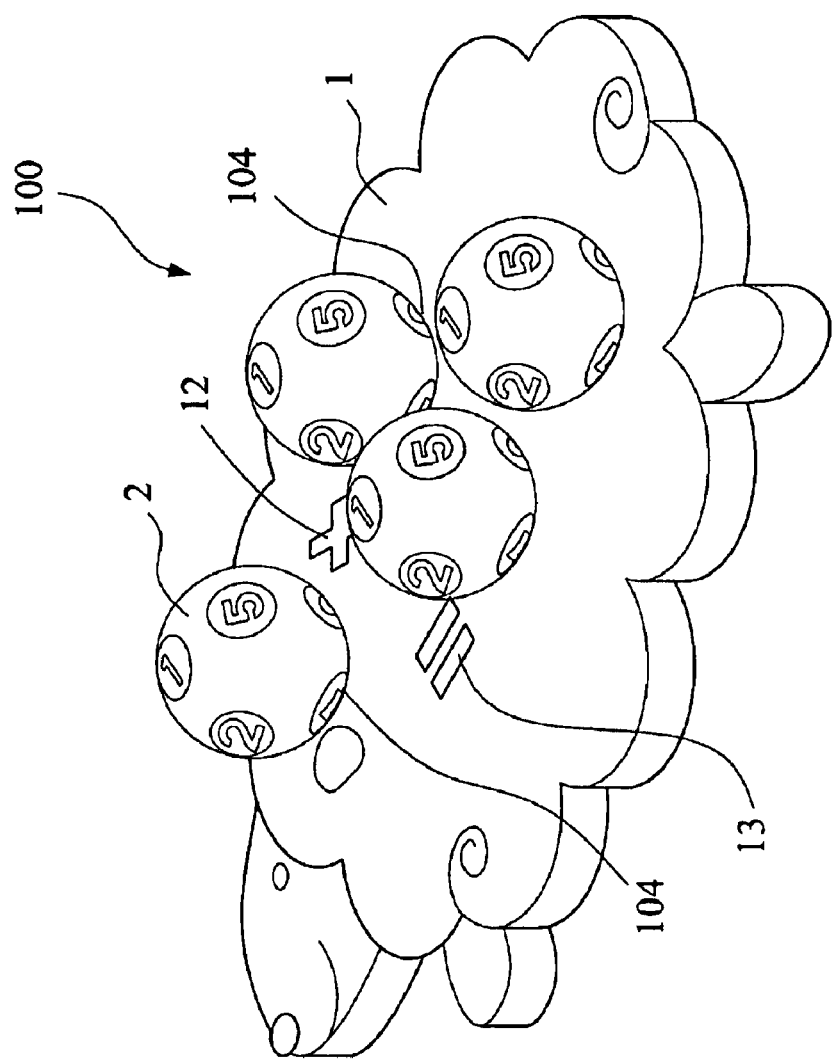
FIG. 3 is a perspective view showing that the RFID tag units are placed on the platform of the learning device of FIG. 1.

With reference to the drawings and in particular to FIGS. 1 to 3, FIG. 1 shows a schematic view of a first embodiment of a learning device using RFID tags constructed in accordance with the present invention; FIG. 2 is a perspective view showing a RFID tag unit and FIG. 3 is a perspective view showing that a number of RFID tag units are placed on a platform.

As shown in the figures, the learning device using RFID tags 100 of the present invention comprises a platform 1 and a plurality of RFID tag units 2. The platform 1 for example imitates a sheep figure with a top plane 101 and a bottom plane 102. In this embodiment, both the top plane 101 and the bottom plane 102 are flat in shape that allows the placing of the RFID tag units 2 on the top plane 101 and that allows the platform 1 to be placed on a flat structure e.g. on a table or hung on wall for operation. However, the platform 1 can be any structure according to requirements and purposes. Preferably, the platform 1 has a lovely, fascinating and desired appearance to match the purposes of the learning and to attract the users and add the interests of using the learning device, such as a certain kind of animal, flower, landscape or figure. A plurality of interrogation zones 104 are defined at the top plane 101 of the platform 1 for the user to place the RFID tag units 2 for detection.

The inner space of the platform 1 is arranged with a RFID reader system. The RFID reader system comprises at least one RFID antenna 105 adjacent to an interrogation zone 104 at the top plane 101 of the platform 1. The RFID antenna 105 is able to receive radio frequency signal within an effective transmission distance. The RFID antenna 105 is electrically connected to a RFID reader 108. The RFID antenna 105 receives the radio frequency signal from the RFID tag unit 2 and transmits a signal S1 to the RFID reader 108. The RFID reader 108 is connected to a processing unit 109. The RFID reader 108 reads the signal S1 and decodes the identification code carried in the signal S1. Then, the RFID reader 108 generates and transmits the signal S1 to the processing unit 109.

After receipt of the signal S1, the processing unit 109 transmits an output signal to an audio/video output device 110. The audio/video output device 110 may comprise a speaker for broadcasting the message. The audio/video output device 110 may comprise a LCD display for showing the message.

Further, the RFID reader system comprises a power supply device 107 for providing an electrical power energy to the RFID reader system. The power supply device 107 is connected to a magnet-actuated switch 106, such as a known reed switch. The magnet-actuated switch 106 is induced to turn on and off by magnetic induction.

When the magnet-actuated switch 106 is induced to turn on, the magnet-actuated switch 106 drives the power supply device 107 to supply power to the RFID reader 108, the processing unit 109 and the audio/video output device 110. The magnet-actuated switch 106 enables the learning device 100 to operate automatically whenever a RFID tag unit 2 is placed at any one of the interrogation zones 104 of the platform 1. Once the RFID tag unit 2 is removed from the platform 1, with no magnetic induction, the power supply device 107 shuts off automatically. Hence, the learning device 100 stops operation when there is no RFID tag unit 2 on the platform 1.

The audio/video output is design can help to save power. Conventionally, a power button is provided on the learning machine and the user has to push the power button to turn on or off the learning device. If the user forgets to turn off the power after use, the learning device will operate until the power is totally consumed. Alternative, a detection switch may be arranged at the RFID reader system to turn on the power supply device.

In the first embodiment of the present invention, the RFID tag unit 2 is a hollow ball structure with an outer surface 201 and an inner space 202. However, the RFID tag unit 2 may be of any form and shape, such as a cube, an octahedron, a dodecahedron and so on.

The outer surface 201 of the RFID tag unit 2 is printed with one or more character, word, figure, or symbol at a message zone 200 on the outer surface 201. The visible symbol 200 represents a message that is designed to teach or entertain the user through the learning device 100. Such message can be any information for the purposes of learning and/or entertainment such as numbers, literal characters, languages, sciences and so on.

The RFID tag unit 2 is mounted with a RFID tag 205, a shielding device 207 and a magnet 208 in the inner space of the RFID tag unit 2. The shielding device 207 is a hollow cylinder with a bottom opening 203 and a top closed end. The shielding device 207 is arranged adjacent to an inductive area 204 defined on the outer surface 201 of the RFID tag unit 2.

The shielding device 207 is oriented in a direction such that the bottom opening 203 is directly opposite to the visible symbol 200. Hence, the inductive area 204 is opposite to the visible symbol 100, such that when the RFID tag unit 2 is placed at the interrogation zone 104 of the platform 1, the user can view the visible symbol 200, while the inductive area 204 contacts the top plane 101 of the platform 1. Through the inductive area 204, the signal from the RFID tag 205 is transmitted straightly downward to the platform 1. The shielding device 207 is made of magnetic material.

The RFID tag may be a known passive tag or an active tag. For RFID tag unit 2 using active RFID tag, an energy source e.g. a battery, is arranged therein for supplying power to the RFID tag for creating and transmitting response signal. Preferably, the RFID tag 205 is a passive tag capable of getting energy from the platform 1 through induction. This can save manufacture cost and dimension of the RFID tag unit, and eliminate the problem of replacement a new battery when the power is completely consumed.

The RFID tag 205 and the magnet 208 are accommodated within the shielding device 207. The RFID tag 205 carries an identification code corresponding to the visible symbol 200 of the RFID tag unit 2. The magnet 208 is arranged at an outer position of the RFID tag 205 and is closed to the outer surface 201 of the RFID tag unit 2. With the arrangement, the signal from the RFID tag 205 of each RFID tag unit 2 is limited to transmit in a single direction though the opening 203 of the shielding device 207. Accordingly, only the RFID antenna 105 directly facing the inductive area 204 of the tag unit 2 can receive the signal from the RFID tag unit 2. Therefore, when a plurality of RFID tag units 2 are placed at different interrogation zones 104 on the platform 1, each RFID antenna 105 can only receive the signal from the RFID tag at the interrogation zone 104 directly facing the RFID antenna 105. The RFID antenna 105 is not interfered by signals from adjacent RFID tag units 2 or signals from other RFID tags 205.

It is noted that the magnet 208 is able to guide the electromagnetic wave in the shielding device 207 and hence reduces the interference among different RFID tag units 2 and interference among RFID tags 205 on the same or different RFID tag units 2. Moreover, the magnet 208 can stick to metal. Preferably, the top plane 101 of the platform 1 is made of metal. This enables the RFID tag unit 2 to stick on the top plane 101 of the platform 1. The learning device of the present invention can be used in horizontal or vertical manner for learning. When the platform 1 is hung on a wall or a blackboard for use, the RFID tag units 2 can stick stably to the platform 1.

For a RFID tag unit 2 printed with more than one symbols 200, as it is seen in FIG. 3, there are an equal number of RFID tags 205, magnets 208 and shielding devices 207 arranged in the same RFID tag unit 2. One set of identification unit, including a RFID tag 205, a magnet 208 and a shielding device 207, is arranged directly opposite to one visible symbol 200, wherein the RFID tag 205 carries an identification code corresponding to the visible symbol 200.

When the RFID tag unit 2 is placed at the interrogation zone 104 of the platform 1 with the inductive area 204 contacting the platform 1, the magnet 208 of the tag unit 2 actuates the magnet-actuated switch 106 to turn on. Subsequently, the magnet-actuated switch 106 drives the power supply device 107 to supply power to the RFID reader 108, processing unit 109 and the audio/video output device 110. As shown, there are a plurality of interrogation zones 104 on the platform 1 for the placement of the RFID tag units 2. Each RFID tag unit 2 transmits its signal to the corresponding antenna 106 below the interrogation zone 104. The RFID antennas 106 receive the signals from the RFID tag units 2 and transmit the signals S1 through the RFID reader 108 to the processing unit 109, and then the processing unit 109 enables the audio/video output device 110 to displaying and/or broadcasting the messages of the RFID tag unit 2.

The top plane 101 of the platform 1 is printed or labeled with marks or symbols to guide the user to place the RFID tag units 2 on the appropriate interrogation zones 104. It can be seen from FIG. 3 how a user exercises multiplication through the learning device using RFID tags 100. In the embodiment, a multiplication sign 12 and an equal sign 13 are printed on the platform 1. One interrogation zone 104 is located at the left side of the multiplication sign 12 and one interrogation zone 104 is located at the right side of the multiplication sign 12. Two adjacent interrogation zones with space therebetween are located at the right side of the equal sign 13.

The user can place any two RFID tag units 2 (the first and second tag unit) respectively at the two sides of the multiplication sign 12 to create a mathematics question. Then, the user may place one or two tag unit (the third and fourth tag unit) after the equal sign 13 to represent his answer. The RFID antennas 106 under the first, second, third and fourth RFID tag units 2 receive the RF signals and transmit the RF signals to the processing unit 109 to identify the numbers represented. The processing unit 109 controls the audio/video device 110 to inform the user whether the answer is correct or not. The learning device 100 can inform the user of the correct answer if the user answers wrongly for more than e.g. three times.

In an application, the learning device 100 is designed to teach Chinese. Chinese words are printed at the message zones 200 of the RFID tag units 2. Standard codes corresponding to the Chinese words are also stored to the corresponding RFID tags. By varying the combination of the Chinese words, i.e. placing the RFID tag units 2 in a sequence, the learning device 100 is able to teach the user the Chinese expression.

In another application of the present invention, the symbol 200 is replaced by a braille. The user, who is blind, can touch the braille to recognize the message of the RFID tag unit 2 by his fingers. A touchable recognized element may be formed on the interrogation zone 104 of the platform 1 to provide a convenient learning device for the blind. An audio device capable of generating audio signal may be combined with the learning device to further help the learning of the blind.

Generally, the platform 1 is formed with a plurality of interrogation zones 104 and arranged with an equal number of RFID antennas 106. Accordingly, an equal number of RFID readers 103 are needed for reading the signals S1 from the RFID antennas 106. This will increase the manufacture cost and the dimension of the learning device 100. In another embodiment, only one RFID reader 108 is used for reading the signals S1 from a plurality of RFID antennas 106.

The RFID reader 108 may be set to receive signals S1 from different RFID antennas according to a predetermined processing algorithm. Take for an example. The RFID reader 108 is set to read the signal S1 from a first antenna first, and after an interval, the RFID reader 108 reads the signal from a second antenna. The RFID reader 108 continues to read the signals from the other antennas until all signals are read. In other words, the RFID reader 108 can be set to read signals from different antennas at a predetermined sequence at predetermined interval.

After the RFID tag units 2 are placed at the interrogation zones 104 of the platform 1, the corresponding RFID antennas 106 receive the signals. The RFID reader 108 reads the signals S1 from the RFID antennas one by one and transmits the signals S1 to the processing unit 109 in sequence. With this arrangement, the manufacture cost and operation power can be saved.

Figure 4:
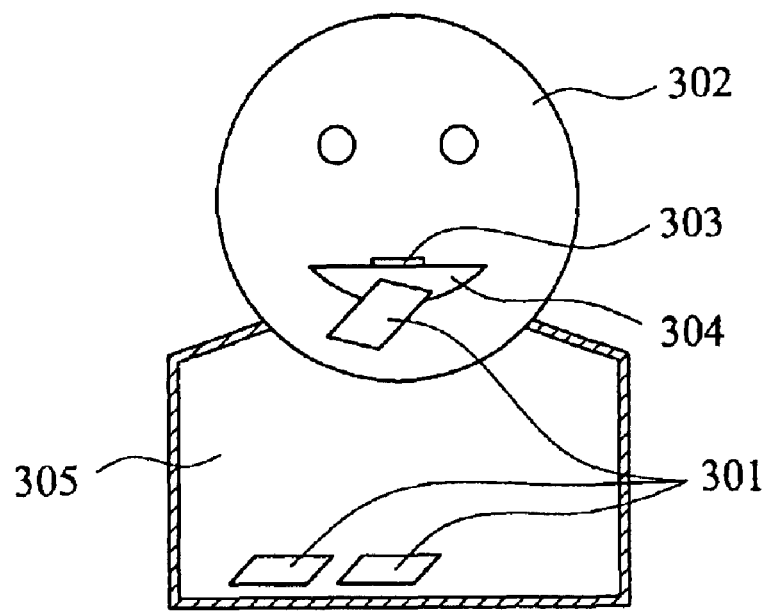
FIG. 4 is a schematic view showing a learning device using RFID tags constructed in accordance with a second embodiment of the present invention.

FIG. 4 shows a second embodiment of the learning device with RFID tags. In this embodiment, the tag unit 301 is in the form of a card. The RFID tag unit 301 is put through an opening formed in the platform 302 and move along a defined pathway 304 in the platform 302. When the RFID tag unit 301 passes through a RFID reader 303 arranged behind the pathway 304, the identification code of the RFID tag unit 301 is read. Finally, the RFID tag unit 301 is collected in a designed inner space 305 or region of the platform 302. In this embodiment, the RFID tag unit 301 is in flat form and the messages in the tag unit 301 are read by dynamic way by the RFID reader 303 during the RFID tag unit 301 passing through the opening 303.

Figure 5:
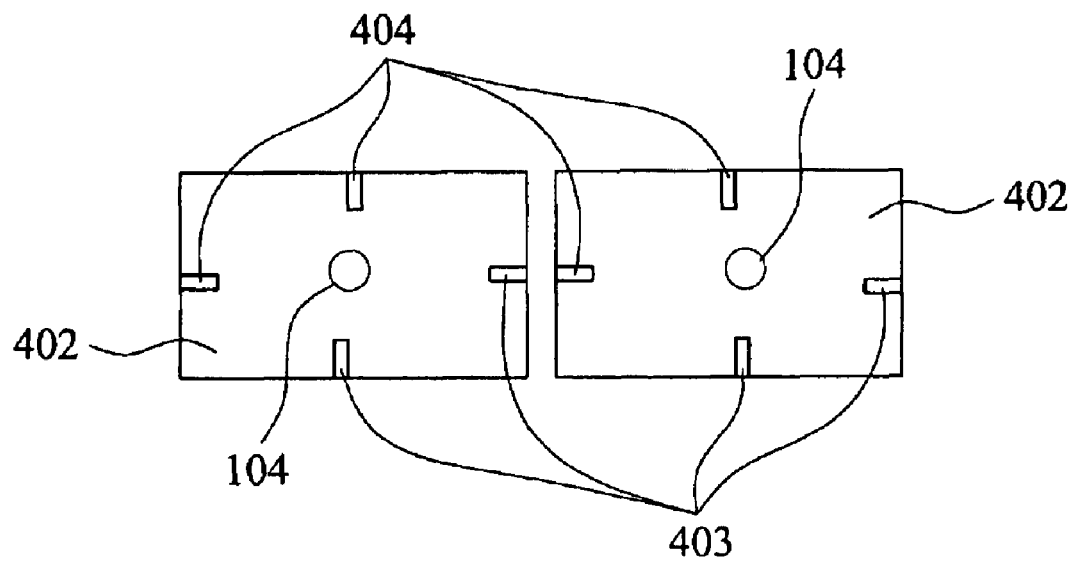
FIG. 5 is a schematic view showing a learning device using RFID tags constructed in accordance with a third embodiment of the present invention, in which two platforms are combined.

FIG. 5 is a schematic view of a learning device using RFID tags constructed in accordance with a third embodiment of the present invention, showing that two platforms are combined to use. As shown, the learning device comprises two platforms 402. Each of the platforms 402 may comprise an individual RFID reader system. Alternatively, the platforms 402 may comprise only some of the components of the RFID reader system e.g. antenna or RFID reader containing antenna, but the platforms 402 in combination can work together to form a complete RFID reader system. Take for an example. Four or more platforms 402 can be combined to form a chessboard. Hence, a platform array of RFID readers is formed.

In this embodiment, the identification of the relative positions of the platforms 402 is critical for the RFID reader system to identify the RF information properly. For this purpose, each of the platforms 402 further comprises a plurality of receivers 403 and a plurality of transmitters 404 correspondent to the receivers 403, forming a RFID reader array system. Each of the transmitters 404 transmits a signal which represents the position of the transmitter 404, while the receivers 403 receive signals from the various transmitters 404. Subsequently, the relative positions of the platforms are recognized. The receiver 403 may be a non-contact type receiver such as an optical receiver or a contact type receiver such as a conductive contact, and correspondingly the transmitter 404 may be a non-contact type transmitter such as an optical transmitter or a contact type transmitter such as a conductive contact.

A single power supply device may be arranged to supply power to the components of the learning device. Alternatively, a plurality of power supply devices may be arranged in each platform. Similarly, a single or a plurality of RFID readers may be used to read the signals. In these ways, the manufacturing cost will be greatly reduced.

The present invention has been described with some preferred embodiments thereof and it is understood that many changes and modifications in the described embodiments can be carried out without departing from the scope and the spirit of the invention that is to be limited only by the appended claims.

What is claimed is:

1. A learning device, comprising:
   at least one RFID tag unit, each of which having an outer surface, an inner space, and a shielding device mounted in the inner space, the shielding device being arranged adjacent to an inductive area defined on the outer surface of the tag unit;
   a RFID tag, which is stored with an identification code and is mounted in the inner space of each tag unit;
   a platform with at least one interrogation zone thereon; and
   a RFID reader system installed in the platform;
   the shielding device including a magnet, and the interrogation zone of the platform being provided with a magnet-actuated switch, the magnet-actuated switch being actuated by the magnet when RFID the tag unit is placed on the interrogation zone of the platform;
   wherein when the RFID tag unit is placed on the interrogation zones of the platform, the RFID reader system reads the RFID tag of the RFID tag unit.

2. The learning device as claimed in claim 1, wherein the magnet-actuated switch is connected to a power supply device for supplying a power source to the RFID reader system when the magnet-actuated switch is actuated by the magnet.

3. The learning device as claimed in claim 1, at least one visible symbol representing the identification code being labeled on a message zone defined on the outer surface of each RFID tag unit.

* * * * *